US009846050B2

(12) United States Patent
Myers et al.

(10) Patent No.: US 9,846,050 B2
(45) Date of Patent: Dec. 19, 2017

(54) SYSTEMS, METHODS, AND DEVICES FOR COMMUNICATING DRIVE HISTORY PATH ATTRIBUTES

(71) Applicant: Ford Global Technologies, LLC, Dearborn, MI (US)

(72) Inventors: Scott Vincent Myers, Camarillo, CA (US); Shane Elwart, Ypsilanti, MI (US); David A Herman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/076,046

(22) Filed: Mar. 21, 2016

(65) Prior Publication Data

US 2017/0268895 A1 Sep. 21, 2017

(51) Int. Cl.
| *G01C 21/34* | (2006.01) |
| *B60Q 1/08* | (2006.01) |
| *B60W 30/12* | (2006.01) |
| *B60W 30/14* | (2006.01) |
| *B60W 40/076* | (2012.01) |
| *B60W 50/14* | (2012.01) |
| *B60W 40/072* | (2012.01) |
| *B62D 15/02* | (2006.01) |
| *G05D 1/02* | (2006.01) |

(52) U.S. Cl.
CPC ......... *G01C 21/3484* (2013.01); *B60Q 1/085* (2013.01); *B60W 30/12* (2013.01); *B60W 30/14* (2013.01); *B60W 40/072* (2013.01); *B60W 40/076* (2013.01); *B60W 50/14* (2013.01); *B62D 15/029* (2013.01); *G01C 21/3415* (2013.01); *G05D 1/0274* (2013.01); *B60W 2550/142* (2013.01); *B60W 2710/30* (2013.01); *B60W 2720/10* (2013.01); *G05D 2201/0213* (2013.01)

(58) Field of Classification Search
CPC ... G01C 21/3484; B60Q 1/085; B60W 30/12; B60W 30/14; B60W 40/072; B60W 40/076
USPC .......................................................... 701/411
See application file for complete search history.

(56) References Cited

U.S. PATENT DOCUMENTS

| 8,577,596 | B2 | 11/2013 | Stählin | |
| 8,744,675 | B2 | 6/2014 | King | |
| 9,047,774 | B2 * | 6/2015 | Tseng | ................... G08G 1/0112 |
| 2005/0256639 | A1 * | 11/2005 | Aleksic | .............. G01C 21/3415 |
| | | | | 701/414 |
| 2010/0036601 | A1 * | 2/2010 | Ozawa | ................... G01C 21/00 |
| | | | | 701/465 |
| 2010/0106603 | A1 * | 4/2010 | Dey | ................... G01C 21/3484 |
| | | | | 705/14.63 |

(Continued)

*Primary Examiner* — Yazan Soofi
(74) *Attorney, Agent, or Firm* — David R. Stevens; Stevens Law Group

(57) ABSTRACT

A method for providing path attributes to controllers in a vehicle includes determining a location of a vehicle and a future driving path for the vehicle. The method includes determining, based on a drive history for the vehicle or a driver of the vehicle, drive history path attributes for the future driving path. The method also includes providing the drive history path attributes to a plurality of controllers via a controller bus, wherein the drive history path attributes are provided to the plurality of controllers using a common protocol.

20 Claims, 5 Drawing Sheets

(56) References Cited

U.S. PATENT DOCUMENTS

| | | | |
|---|---|---|---|
| 2013/0024104 A1 | 1/2013 | Stählin | |
| 2013/0158794 A1 | 6/2013 | Wilson | |
| 2014/0278070 A1* | 9/2014 | McGavran | G01C 21/00 701/465 |
| 2015/0276419 A1* | 10/2015 | Hashem | G01C 21/20 701/425 |
| 2015/0292893 A1* | 10/2015 | Bartsch | G01C 21/34 701/408 |
| 2015/0300825 A1 | 10/2015 | Manoliu | |

* cited by examiner

SYSTEMS, METHODS, AND DEVICES FOR COMMUNICATING DRIVE HISTORY PATH ATTRIBUTES

TECHNICAL FIELD

The disclosure relates generally to methods, systems, and apparatuses for communicating drive history path attributes.

BACKGROUND

Automobiles provide a significant portion of transportation for commercial, government, and private entities. Due to the high value of automobiles and potential harm to passengers and drivers, driver safety and avoidance of collisions, accidents, or other damage to vehicles are extremely important. In order to have more detailed information about a section of roadway or other driving environment, some vehicles may store drive histories, which include detailed information gathered by sensors for later recall when traversing the same roadways.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
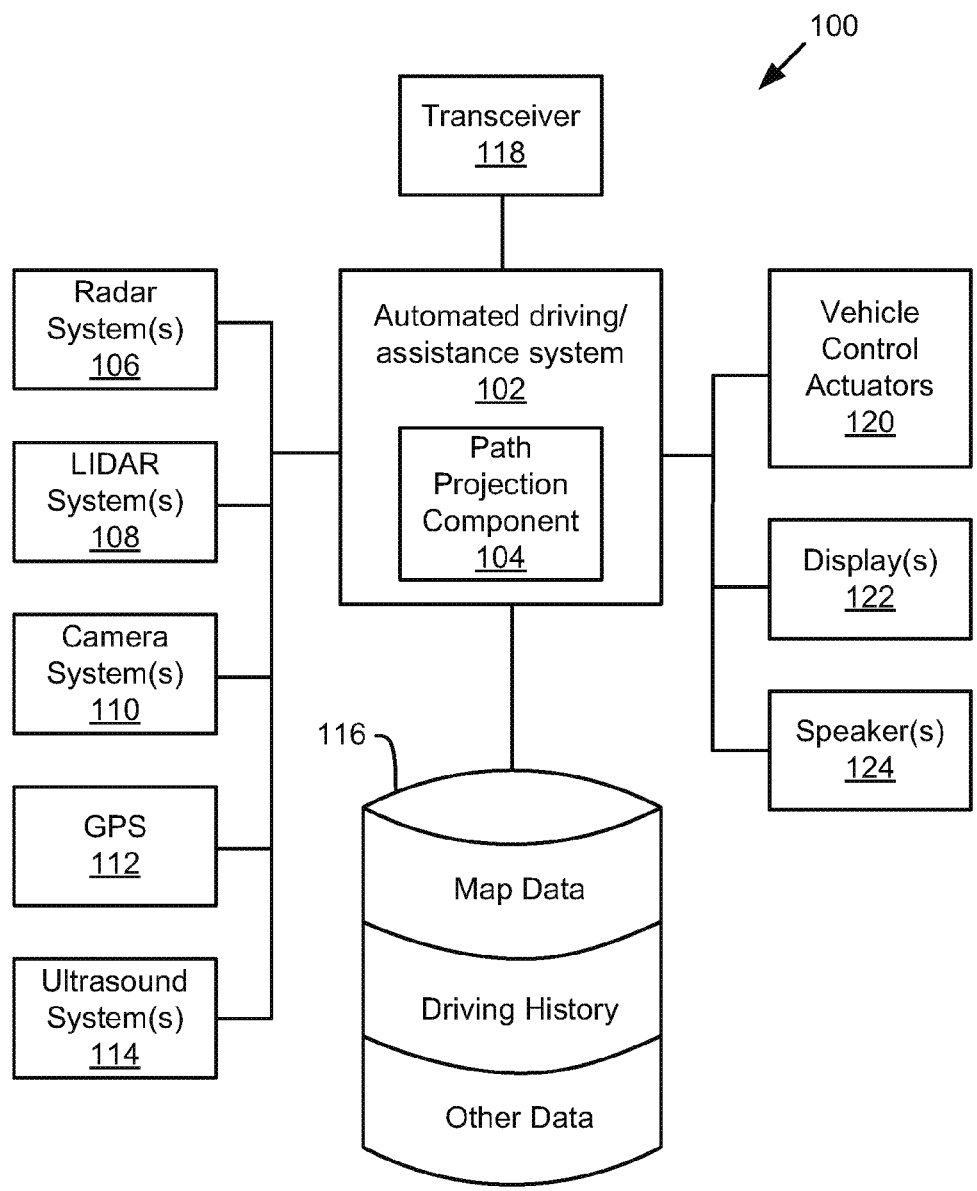
FIG. 1 is a schematic block diagram illustrating an implementation of a vehicle control system that includes an automated driving/assistance system.

Attributed predicted paths for vehicles provide information about a roadway or a driving path ahead of a vehicle based on electronic map data. For example, attributed predicted paths may be able to provide information about road curvature, tilt of a roadway, or a plurality of other details. This information may be used by a human driver or an automated driving system to safely, efficiently, and accurately drive the car along a desired path. The Advanced Driver Assistance Systems Interface Specification (ADASIS) provides standards for attributed predicted path provider operation to allow interconnection of driver assistance systems (or automated driving systems) from different providers or companies. The different components, may then be able to communicate with each other over a controller area network (CAN) bus. For example, sensors or data sources may publish data to the CAN bus while controllers of various systems may be able to access that data for processing in controlling the vehicle and/or providing assistance to a human driver.

However, ADASIS Horizon or attributed predicted path information (or data available in a map) may be limited in the amount of detail that is available. In some cases, additional detail may be available for paths previously traveled by a driver or vehicle in a drive history. However, getting drive history information to the applications or controllers is currently very inefficient and difficult. For example, drive history knowledge, when used, is communicated to other controllers using one-to-one communication protocols. Thus, separate messages must be sent to each controller and each controller may require data or messages in different formats or use different protocols.

Applicant has developed systems, methods, and devices that provides significant improvements to existing drive history and ADASIS Horizon or attributed predicted path providers. According to one embodiment, a method for providing drive history information includes determining a location of a vehicle and determining a future driving path for the vehicle. The method also includes determining, based on a drive history for the vehicle or a driver of the vehicle, drive history path attributes for the future driving path. The method includes providing the drive history path attributes to a plurality of controllers via a controller bus. The drive history path attributes are provided to the plurality of controllers using a common protocol.

In one embodiment, drive history information may be provided to controllers on a bus over a controller bus (such as a CAN bus). In one embodiment, Applicant proposes modifications of or additions to the ADASIS standard to include a common protocol allowing a drive history provider to broadcast path attributes to all other controllers on the bus. For example, the ADASIS standard may be modified to allow path attributes from a drive history provider to be published to the CAN bus and allow path attributes from an ADASIS Horizon or attributed predicted path provider to be published on the CAN bus. In one embodiment, each reconstructor (such as a controller listening on the bus) would recreate a small subset of the path database for specific uses, needs or applications of the controller. For example, the controllers may use or implement a myriad of applications and may include, but are not limited to, an adaptive cruise control, an energy management controller, a curve warning controller, a headlight controller, a lane departure warning system, a hill power train optimization controller, a driver notification system, an automated driving system, and/or a driver assistance system. An adaptive cruise may adapt a controlled speed of the vehicle based on traffic, road geometry or other environmental factors. An energy management controller may manage speed or vehicle accessory systems (such as heating or cooling) based on predicted incline, decline, or the like of a roadway. A curve warning controller may control a notification system to warn of the presence, severity, or curvature of one or more upcoming turns or curves in a roadway. A headlight controller may control a direction of light cast by a headlight to cover the roadway even when the roadway is curvy. A lane departure warning system may give a warning when the vehicle departs from a lane on the roadway. A hill power train optimization controller may control a power train, including a gear and/or rotation speed of a motor or engine to optimize power usage. A driver notification system may provide notifications to a driver of a suggested speed for a current roadway, curve, or a vehicle maneuver. In one embodiment, controllers may both receive from and provide data to the controller bus.

In one embodiment, a system may learn new routes as well as route attributes while a vehicle is being driven. For example, as a driver drives a vehicle to a destination, sensors of the system may log route attributes or other detailed information about the route, which may be recalled later. When the same route is being traveled again, the vehicle or system may recognize that this route has been traveled before and pull up the route attributes or other detailed information to help with navigation or any other driver assistance or automated driving task.

In one embodiment, the recalled path attributes may be used to construct and project a forward path. For example, the details of the forward path may be assembled into a matrix or other representation of the path in front of the vehicle to allow a driver or other system to anticipate features or attributes of the road or path ahead. The amount of the path to project may be based on a current speed of the vehicle or a current speed limit for the roadway on which a vehicle is being driven. As the vehicle moves along the path, additional path attributes may be provided (e.g., over a CAN bus) so that there is always some information about the pathway ahead. In one embodiment, a system may re-project the forward path when the previous projection has been nearly traversed.

If a vehicle does not follow the projected path or a predicted driving route, a system may flush or discard the published path attributes. For example, if a vehicle turns off the predicted path the path attributes may not apply to the new route and may be discarded using CAN bus messages similar to those described in the ADASIS protocol. If available, path attributes for the new path may be determined and projected upon transition to the new path. If the path is unknown or does not have correlated information in a drive history, the forward path may be projected as well as possible with data from an electronic map or ADASIS Horizon or attributed predicted path provider.

Referring now to the figures, FIG. 1 illustrates an example vehicle control system 100 that may be used for assisting a human driver or performing automated driving. The vehicle control system 100 may comprise an automated driving/assistance system 102. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 may include a path projection component 104 that provides information about path attributes to a human driver, one or more driving control systems, or other controllers that control any aspect of automated driving or driver assistance.

The vehicle control system 100 also includes one or more sensor systems/devices for detecting a presence of nearby objects, lane markers, and/or or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultrasound systems 114. The vehicle control system 100 may include a data store 116 for storing relevant or useful data for navigation and safety such as map data, a driving history (i.e., drive history), or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering or the like. The vehicle control system 100 may include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path within lanes on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time. The automated driving/assistance system 102 may implement one or more algorithms, applications, programs, or functionality that drive or assist in driving of the vehicle.

In one embodiment, the camera systems 110 may include a plurality of cameras. For example, the camera systems 110 may include cameras facing in different directions to provide different views and different fields of view for areas near or around the vehicle. For example, some cameras may face forward, sideward, rearward, at angles, or in any other direction.

Figure 2:
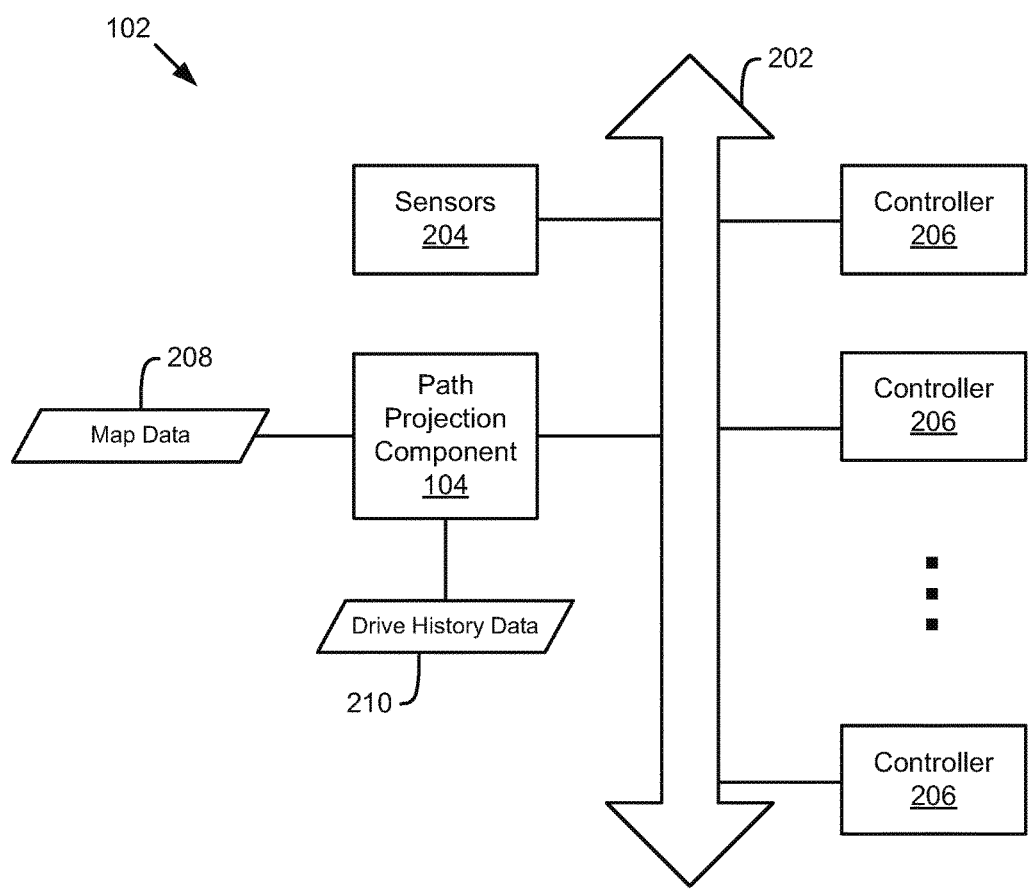
FIG. 2 is a schematic block diagram illustrating an automated driving/assistance system, according to one implementation.

FIG. 2 is a schematic block diagram illustrating an automated driving/assistance system 102. The automated driving/assistance system 102 includes a controller bus 202, one or more sensors 204, a plurality of controllers 206, and a path projection component 104. As will be understood by one skilled in the art, additional or fewer components may be included in the automated driving/assistance system 102, without limitation.

The controller bus 202 may provide a communication medium for receiving and sending messages or data. In one embodiment, the controller bus 202 may include a processor and data storage for storing data and/or retrieving data. For example, the controller bus 202 may store messages or data published on the bus, which can then be accessed or requested by another component on the bus. In one embodiment, the controller bus 202 includes a CAN bus as described by an ADASIS specification.

The sensors 204 may include any sensors or data sources that can provide data used by the controllers 206 or path projection component 104. For example, one or more of a radar system 106, LIDAR system 108, camera system 110, GPS 112, ultrasound system 114, or data store 116 may publish data to the controller bus 202 for use by the controllers and/or the path projection component 104. The path projection component 104 may determine path attributes for a path to be traveled by a vehicle and/or provide path attributes for a path to be traveled by a vehicle to the controller bus. The path projection component 104 may determine the path attributes based on map data 208 (e.g., from an electronic map or an ADASIS Horizon or attributed predicted path provider) and/or drive history data 210 (e.g., from a drive history specific to paths or locations already traveled by the driver and/or vehicle) so that aspects of the future roadway not yet detectable by the sensors 204 may be accounted for in advance. The path attributes may correspond to a section of a future path that is immediately ahead of the vehicle and that may be used by the controllers 206 to perform driver assistance or automated driving tasks. The controllers may include physical controllers and/or logical controllers that provide physical actuation or control signals for various aspects of a vehicle, such as of the vehicle control system 100 of FIG. 1. Example driver assistance or automated driving tasks performed by the controllers 206 may include, by way of example, driver notifications, drive train or suspension adjustments, speed adjustments, object or pedestrian detection, localization within a roadway, driving path generation for the current route (e.g., where on a roadway to position the vehicle), or the like.

Figure 3:
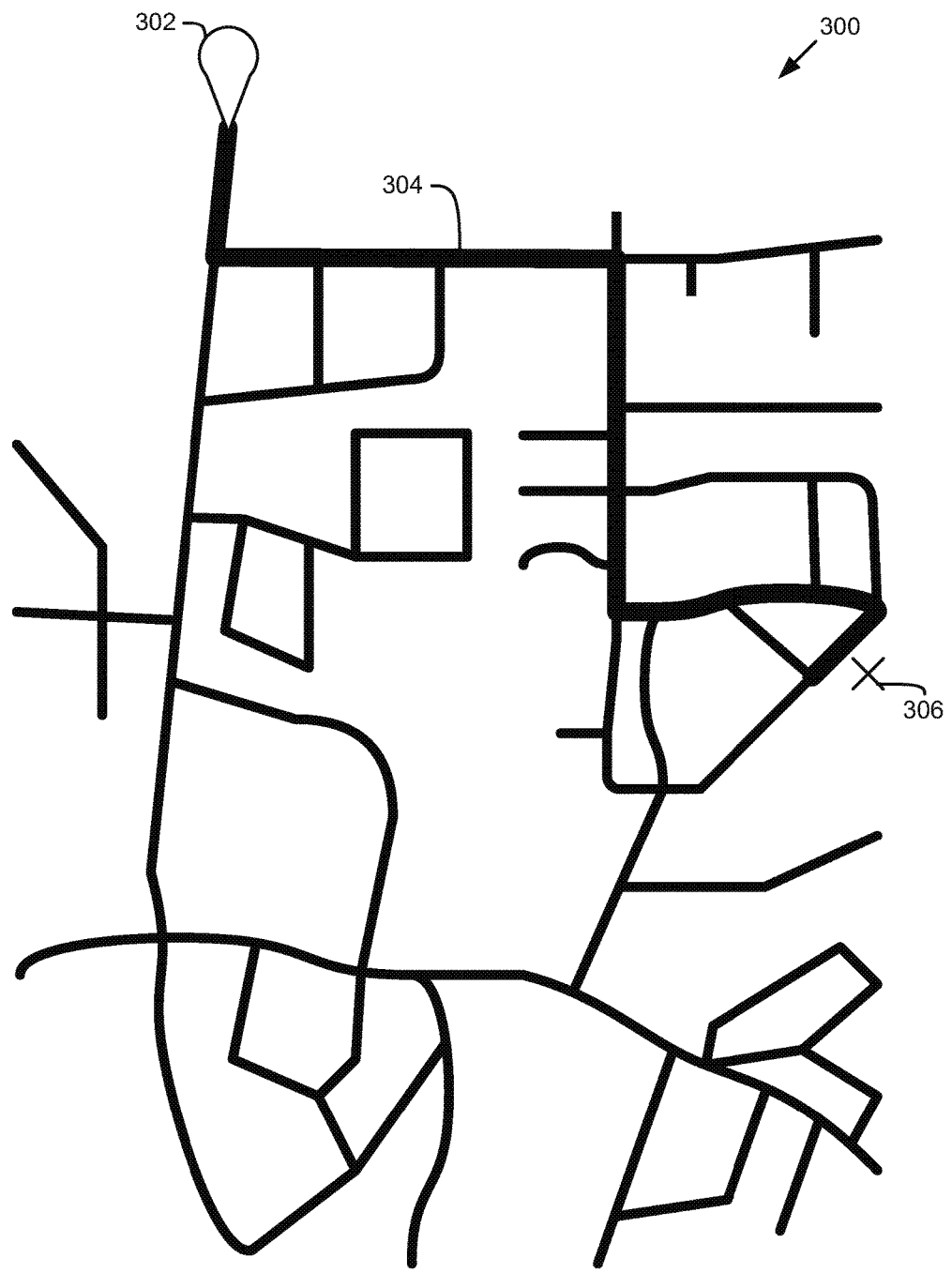
FIG. 3 illustrates a map of roadways near a current location of a vehicle, according to one implementation.

FIG. 3 illustrates a map 300 of roadways near a current location 302 of a vehicle. For example, the map 300 may illustrate roadways near the vehicle that are found in an electronic map accessible by the vehicle. The current location 302 of the vehicle may be obtained from a positioning system. For example, the vehicle may include a global navigation satellite system (GNSS) receiver, such as a Global Positioning System (GPS) receiver, Global Navigation Satellite System (GLONASS) receiver, Galilleo, or Beidou system mounted in the vehicle. Using the current location and/or any other available data, the path projection component 104 may determine or predict a destination and/or a most probable path for the vehicle. Example data that may be used to determine the most probable path include vehicle or human drive history, time of day, current location, passenger or driver identity, day of the week, information from a navigation system (such as a destination or current route), or the like. A most probable path 304 and probable destination 306, which may be identified by the path projection component 104, is shown on the map 300.

In one embodiment, the path projection component 104 may obtain path attributes from a drive history, electronic map, ADASIS Horizon or attributed predicted path provider, or any other source for at least a portion of the most probable path 304. For example, road geometry, speed limits, actual driving speeds of the vehicle or driver, previously detected obstacles or hazards, or the like may be determined and provided to a controller bus. This data may be used by the controllers and/or related applications to prepare for the path ahead and/or perform functions or tasks that benefit from having predicted or anticipatory data. It may be that the data provided by the path projection component 104 is not exactly accurate due to the possibility of changes since a map was created or since the last time the vehicle drove the route and gathered drive history data. However, this data may provide a good enough indication of what is to come so that the vehicle or driver can be prepared for the route.

Figure 4:
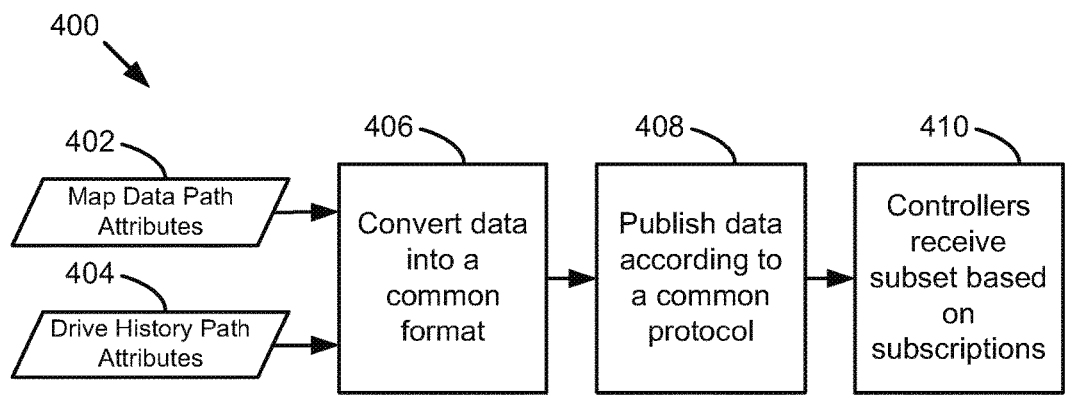
FIG. 4 is a schematic diagram illustrating a method for publishing data to a plurality of controllers, according to one implementation.

FIG. 4 is a schematic diagram illustrating a method 400 for publishing path attributes in a common format, according to one embodiment. The method 400 may be performed by a path projection component 104 and/or an automated driving/assistance system 102.

The method 400 begins and the path projection component 104 converts map data path attributes 402 and/or drive history path attributes 404 into a common format at 406. The map data path attributes 402 may be determined by the path projection component 104 and/or may be provided by an ADASIS Horizon or attributed predicted path provider. The drive history path attributes 404 may be determined by the path projection component 104 and/or may be provided by a drive history provider or data store. The path projection component 104 may convert at 406 the path attributes 402, 404 into a common format corresponding to a controller bus and any devices, systems, or controllers connected to the controller bus. In one embodiment, the common format may be common to the controller bus and/or all systems connected to the bus. Thus, only one version of data may need to be published to the controller bus and a plurality of message carrying the same or similar data for different controllers may not be needed.

The path projection component 104 publishes at 408 the data in the common format according to a common protocol. For example, the common protocol may correspond to a protocol used by the controller bus. The path projection component 104 may publish at 408 the data by sending a message that includes any path attributes and/or an identifier or tag indicating the type of data in the message. At 410, one or more controllers receive a subset of the published data based on their subscriptions. For example, there may be different categories for data, which may be published on the controller bus, and some controllers may only need some subset of those data types. For example, each controller may provide a list of subscriptions to the controller bus and the controller bus may forward messages or data corresponding to the subscriptions, or may notify a controller that data corresponding to a subscription has been received. Thus, the controllers may receive at 410 only a subset of the data. Additionally, multiple controllers may receive the same data in the same format or protocol without requiring the path projection component 104 to send the data two or more times or in different formats. The controllers, after receiving the subset of data at 410, may reconstruct the data for use in the task or application that uses that data.

By providing data using a common protocol significant reduction in resource usage and development time for an automated driving/assistance system 102 may be achieved. For example, previously, a special protocol would have to be created for each application in each controller. However, with the common protocol, those devices that are configured to communicate over the CAN bus may be able to receive the path attributes and only one message may need to be sent and the data may be accessible by any controller connected to the CAN bus. These benefits may be available for automated driving systems or driver assistance systems. For example, human driven vehicles may be able to provide details or warnings about a path ahead to a human driver or provide intelligent cruise control functionality. As another example, automated vehicles may benefit from rich sensor data and reduced messaging and processing requirements of embodiments disclosed herein.

Figure 5:
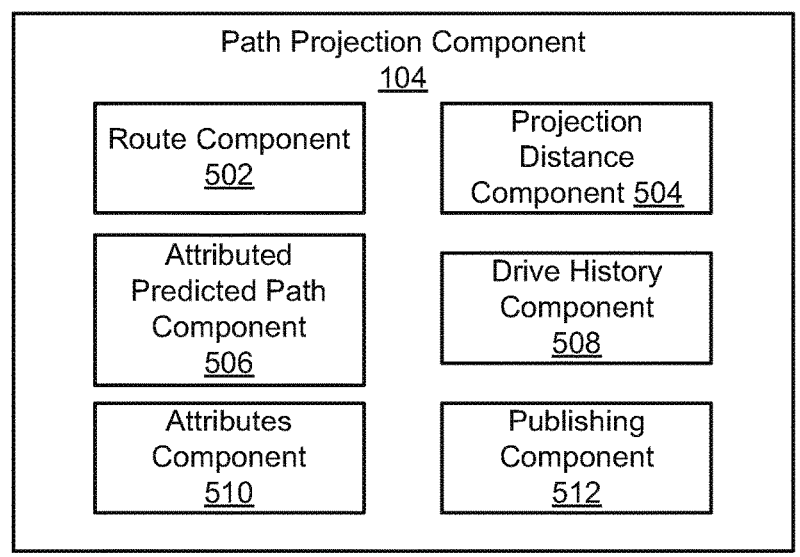
FIG. 5 is a schematic block diagram illustrating example components of a path projection component, according to one implementation.

FIG. 5 is a block diagram illustrating example components of a path projection component 104, according to one implementation. In the depicted embodiment, the path projection component 104 includes a route component 502, a projection distance component 504, an attributed predicted path component 506, a drive history component 508, an attributes component 510, and a publishing component 512. The components 502-512 are given by way of illustration only and may not all be included in all embodiments. In fact, some embodiments may include only one or any combination of two or more of the components 502-510. Furthermore, some of the components 502-510 may be located outside the path projection component 104, such as within an automated driving/assistance system 102, ADASIS Horizon or attributed predicted path provider, or drive history provider.

The route component 502 is configured to determine a route for a parent vehicle, such as a vehicle in which the path projection component 104 is located or installed. In one embodiment, the route component 502 may determine a most probable route or path for the vehicle based on available information. For example, the route component 502 may determine a likely destination and/or route based on the time of day, a drive history, a home location, a work location, a driver or passenger identity, or any other information. In one embodiment, the route component 502 may receive destination and/or route information from a navigation system. In one embodiment, the most probable route or path may match or vary slightly from the route or destination provided by the navigation system.

In one embodiment, the route component 502 may detect a variation from the predicted route (e.g., most probable route or path) and/or calculate or determine a new most probable path based on the variation. For example, if the predicted path is not correct and/or is not followed by the vehicle, the route component 502 may determine a new most probable route or path.

The projection distance component 504 is configured to determine a distance for which a path should be projected for the vehicle. In one embodiment, the distance is based upon a current speed or velocity of the vehicle. For example, the projection distance component 504 may select a larger projection distance if the vehicle is moving faster or has a route that extends along a route with a high speed limit. In one embodiment, the projection distance component 504 may determine a projection distance based on an amount of memory available to the path projection component 104. In one embodiment, the projection distance component 504 may determine a projection distance based on an amount of time it will take to travel a specific distance. For example, the projection distance may correspond to a distance it will take the vehicle to travel one minute, or any other time period, along a most probable path or route selected or identified by the route component 502.

The attributed predicted path component 506 is configured to determine map path attributes based on an electronic map. In one embodiment, the attributed predicted path component 506 determines the map path attributes by retrieving data about a roadway from an electronic map. For example, the attributed predicted path component 506 may retrieve details about road geometry, tilt, slope, curvature, or the like from an electronic map for a region between a current location of the vehicle and a location at a projection distance away from the vehicle. In one embodiment, the attributed predicted path component 506 receives the map path attributes or attributed predicted path attributes from an ADASIS Horizon or attributed predicted path provider separate or external from the path projection component 104. For example, the attributed predicted path component 506 may provide information about a region for which path attributes are needed to an ADASIS Horizon or attributed predicted path provider and receive the map path attributes from the ADASIS Horizon or attributed predicted path provider.

The drive history component 508 is configured to determine drive history path attributes based on a drive history. For example, the drive history may include data stored in a data store corresponding to roadways, routes, or paths previously traveled by the vehicle and/or a driver or passenger of the vehicles. In one embodiment, the drive history component 508 determines the drive history path attributes by retrieving data about a roadway from a drive history. For example, the attributed predicted path component 506 may retrieve details about road geometry, tilt, slope, curvature, hazards, or the like from a drive history for a region between a current location of the vehicle and a location at a projection distance away from the vehicle. In one embodiment, the information from a drive history may be more accurate and/or detailed than information provided by an ADASIS Horizon or attributed predicted path or electronic map because the data may correspond to data actually gathered and/or experienced by sensors of the vehicle. In one embodiment, the drive history component 508 receives the drive history attributes from drive history provider separate or external from the path projection component 104. For example, the drive history component 508 may provide information about a region for which path attributes are needed to a drive history provider and receive the drive history path attributes from the drive history provider.

The attributes component 510 is configured to determine one or more path attributes for a projected path. In one embodiment, the attributes component 510 determines the path attributes based on drive history path attributes provided by the drive history component 508 and/or map path attributes provided by the attributed predicted path component 506. At times, there may be no drive history for a current location or a predicted path of the vehicle and only ADASIS Horizon or attributed predicted path or map path attributes are available. In one embodiment, the attributes component 510 may determine data for a distance corresponding to a projection distance ahead of the vehicle's current location. As the vehicle travels the roadway, the attributes component 510 may gather or determine additional path attributes to maintain or provide path attributes for the projection distance ahead of the vehicle. For example, as the vehicle proceeds along a route additional path attributes for subsequent sections of roadway may be determined. In one embodiment, if a change in path is detected by the route component 502, the attributes component 510 may determine attributes for a new predicted or most probable route or path.

In one embodiment, the path attributes may also include path attributes for stubs, or possible side routes for the vehicle. For example, the path attributes may include path attributes not only along the most probable route or path identified by the route component 502, but also path attributes for any roadways that intersect with the most probable route. This may provide sufficient information for a short distance until an alternate route can be calculated and additional path attributes or data can be obtained.

In one embodiment, the attributes component 510 converts the path attributes into a common format. For example, the attributes component 510 may convert path attributes from different sources, such as from the attributed predicted path component 506 and/or the drive history component 508 into a common format that can be interpreted or used by all of the controllers on a controller bus. Thus, all controllers may be able to use the information obtained by the attributes component 510.

The publishing component 512 is configured to provide path attributes to a plurality of controllers. In one embodiment, the publishing component 512 provides the path attributes to the controllers using a controller bus, such as a CAN bus. The publish component 512 may send one or more messages that publish path attributes for a section of the road ahead of the vehicle to the controller bus. The messages may be sent according to a common protocol so that controllers that need the same data can access the same message. For example, each controller does not require its own specific message in order to obtain needed path attributes. Rather this data is published to the controller bus and those controllers that need the data can access, receive, and/or retrieve that data. The common protocol may specify message types, data types, message formats, and/or data formats so that the data is communicated in a standardized manner than can be utilized by any controller on the bus.

In one embodiment, one or more controllers on the bus may only end up receiving and/or using a subset of all the path attributes placed on the controller bus. For example, controller that suggests a speed to a human driver may not need every type of path attribute in order to determine and/or suggest a speed. In one embodiment, a controller may subscribe to a subset of data or certain types of path attributes. For example, the controller may provide a subscription list that indicates the types of path attributes that the controller would like to receive when that data is published to the bus. The controller bus may store and manage a subscription list that indicates which controllers are subscribed to which types of messages or data. In response to receiving messages publishing path attributes to the controller bus, the controller bus may compare the message type or data type to a subscription list and provide the message to the subscribed controllers. Thus, controllers may not need to process or receive every message on the controller bus and may simply use the data they need for reconstruction and/or use for the applications of the controller.

In one embodiment, the publishing component 512 may continue to publish additional path attributes as the vehicle traverses a route and/or when the route changes. For example, if the route component 502 detects a departure from a predicted route, the publishing component 512 may obtain path attributes for a new route or path from the attributes component 510 and publish those path attributes for the new route or path to the controller bus. Additionally, if the route changes, the publishing component 512 may send messages on the controller bus to indicate that previously sent data is or is not outdated and/or should be discarded. The controller bus may then discard the outdated or unneeded data and/or notify controllers of the change. The controllers may then be able to utilize data for the new route or path for their respective applications.

Figure 6:
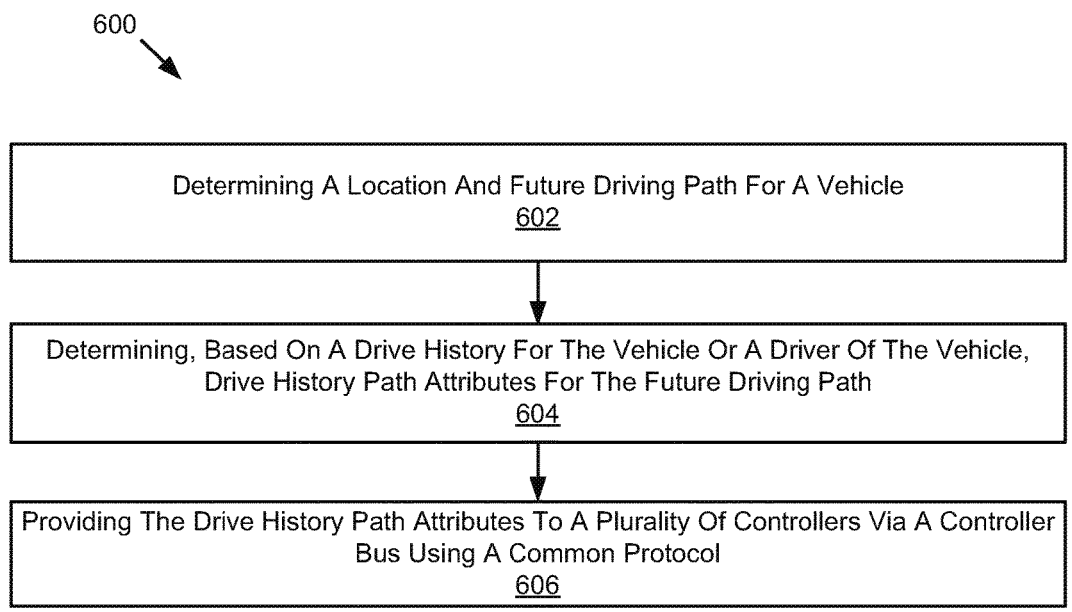
FIG. 6 is a schematic flow chart diagram illustrating a method for publishing path attributes to one or more controllers, according to one implementation.

Referring now to FIG. 6, a schematic flow chart diagram of a method 600 for providing path attributes is illustrated. The method 600 may be performed by a path projection component or an automated driving/assistance system, such as the path projection component 104 of FIG. 1, 2, or 5 or the automated driving/assistance system 102 of FIG. 1 or 2.

The method 600 begins and a route component 502 determines at 602 a location and a future driving path for a vehicle. For example, the route component 502 receives an indication of location from a GNSS receiver in the vehicle and may predict a destination and/or route the driver or vehicle will take to get to the destination from the current location. An attributes component 510 determines at 604, based on a drive history for the vehicle or a driver of the vehicle, drive history path attributes for the future driving path. The publishing component 512 provides at 606 the drive history path attributes to a plurality of controllers via a controller bus using a common protocol. For example, the drive history path attributes may be provided in a format and/or using a protocol that any controller on the controller bus that utilizes that type of path attribute (e.g., roadway geometry) is able to use and process the drive history path attributes.

EXAMPLES

The following examples pertain to further embodiments.

Example 1 is a method that determining, based on a drive history for the vehicle or a driver of the vehicle, drive history path attributes for the future driving path. The method also includes providing the drive history path attributes to a plurality of controllers via a controller bus, wherein the drive history path attributes are provided to the plurality of controllers using a common protocol.

In Example 2, each of the plurality of controllers in Example 1 are configured to receive or process the drive history path attributes in the common protocol.

In Example 3, the controller bus in any of Examples 1-2 is configured to publish a subset of the drive history path attributes to a specific controller of the plurality of controllers based on a subscription of the specific controller.

In Example 4, the controller bus in any of Examples 1-3 includes a CAN bus.

In Example 5, the method of any of Examples 1-4 further includes determining map path attributes based on an electronic map and providing the map path attributes to the plurality of controllers via the controller bus using the common protocol.

In Example 6, the method in any of Examples 1-5 further include determining a projection distance along the future driving path, wherein the drive history path attributes correspond to a portion of the future driving path corresponding to the projection distance.

In Example 7, the method in Example 6 further includes, during driving of the vehicle along the future driving path, providing additional path attributes for the future driving path up to the projection distance from a current position of the vehicle.

In Example 8, the method in any of Examples 1-7 further includes detecting a departure from the future driving path to an alternate path and, in response to detecting the departure, providing path attributes for the alternate path based on one or more of a map and the drive history.

In Example 9, the method of Example 8 further includes discarding path attributes from the future driving path in response to detecting the departure.

Example 10 is a system that includes a controller bus, a plurality of controllers in communication with the controller bus, a positioning system configured to determine a location of a vehicle, a route component, and a path projection component. The route component is configured to determine a driving path for the vehicle. The path projection component is configured determine and provide drive history path attributes for the driving path to the plurality of controllers via the controller bus, wherein the drive history path attributes are provided to the plurality of controllers using a common protocol.

In Example 11, each of the plurality of controllers in Example 10 are configured to receive or process the drive history path attributes in the common protocol.

In Example 12, the controller bus in any of Examples 10-11 is configured to publish a subset of the drive history path attributes to a specific controller of the plurality of controllers based on a subscription of the specific controller.

In Example 13, the controller bus in any of Examples 10-12 includes a CAN bus.

In Example 14, the system in any of Examples 10-13 further includes an attributed predicted path component configured to determine map path attributes based on an electronic map and the path projection component is configured to provide the drive history path attributes to the plurality of controllers via the controller bus using the common protocol.

In Example 15, the system in any of Examples 10-14 further includes a projection distance component configured to determine a projection distance along the future driving path, wherein the drive history path attributes provided by the path projection component correspond to a portion of the future driving extending from the location of vehicle to the projection distance.

In Example 16, the plurality of controllers in any of Examples 10-15 include one or more of an adaptive cruise control, an energy management controller, a curve warning controller, a headlight controller, a lane departure warning system, a hill power train optimization controller, a driver notification system, an automated driving system, and a driver assistance system.

Example 17 is computer readable storage media storing instructions that, when executed by one or more processors, cause the processors to determine a location of a vehicle and to determine a future driving path for the vehicle. The instructions further cause the one or more processors to determine, based on a drive history, drive history path attributes for the future driving path. The instructions further cause the one or more processors to provide the drive history path attributes to a plurality of controllers via a controller bus, wherein the path attributes are provided to the plurality of controllers using a common protocol.

In Example 18, each of the plurality of controllers are configured to receive or process the drive history path attributes in the common format.

In Example 19, the controller bus is configured to publish a subset of the drive history path attributes to a specific controller of the plurality of controllers based on subscriptions of the specific controller.

In Example 20, the controller bus comprises a CAN bus.

Example 21 is a system or device that includes means for implementing a method, system, or device as in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "autonomous vehicle" may be a vehicle that acts or operates completely independent of a human driver; or may be a vehicle that acts or operates independent of a human driver in some instances while in other instances a human driver may be able to operate the vehicle; or may be a vehicle that is predominantly operated by a human driver, but with the assistance of an automated driving/assistance system.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
   determining a location of a vehicle;
   determining a future driving path for the vehicle;
   determining, based on a drive history for the vehicle or a driver of the vehicle, drive history path attributes for the future driving path, the drive history path attributes comprising one or more of road geometry, speed limits, previous actual driving speeds of the vehicle or driver, or previously detected obstacles or hazards along the future driving path; and
   providing the drive history path attributes to a plurality of controllers via a controller bus, wherein the drive history path attributes are provided to the plurality of controllers using a common protocol, wherein two or more of the plurality of controllers receive a specific path attribute via a single message on the controller bus, and wherein the plurality of controllers control operation of the vehicle during driving of the future driving path based on the drive history path attributes.

2. The method of claim 1, wherein each of the plurality of controllers are configured to receive or process the drive history path attributes in the common protocol.

3. The method of claim 1, wherein the controller bus is configured to publish a subset of the drive history path attributes to a specific controller of the plurality of controllers based on a subscription of the specific controller.

4. The method of claim 1, wherein the controller bus comprises a controller area network (CAN) bus.

5. The method of claim 1, further comprising determining map path attributes based on an electronic map and providing the map path attributes to the plurality of controllers via the controller bus using the common protocol.

6. The method of claim 1, further comprising determining a projection distance along the future driving path, wherein the drive history path attributes correspond to a portion of the future driving path corresponding to the projection distance.

7. The method of claim 6, further comprising, during driving of the vehicle along the future driving path, providing additional path attributes for the future driving path up to the projection distance from a current position of the vehicle.

8. The method of claim 1, further comprising:
   detecting a departure from the future driving path to an alternate path; and
   in response to detecting the departure, providing path attributes for the alternate path based on one or more of a map and the drive history.

9. The method of claim 8, further comprising discarding path attributes from the future driving path in response to detecting the departure.

10. A system comprising:
    a controller bus of a vehicle;
    a plurality of controllers in communication with the controller bus;
    a positioning system configured to determine a location of the vehicle;
    a route component configured to determine a driving path for the vehicle; and a path projection component configured determine and provide drive history path attributes for the driving path to the plurality of controllers via the controller bus, wherein the drive history path attributes are provided to the plurality of controllers using a common protocol;

wherein two or more of the plurality of controllers receive a specific path attribute via a single message on the controller bus, and wherein the plurality of controllers control operation of the vehicle during driving of the future driving path based on the drive history path attributes.

11. The system of claim 10, wherein each of the plurality of controllers are configured to receive or process the drive history path attributes in the common protocol.

12. The system of claim 10, wherein the controller bus is configured to publish a subset of the drive history path attributes to a specific controller of the plurality of controllers based on a subscription of the specific controller.

13. The system of claim 10, wherein the controller bus comprises a controller area network (CAN) bus.

14. The system of claim 10, further comprising an attributed predicted path component configured to determine map path attributes based on an electronic map and providing the drive history path attributes to the plurality of controllers via the controller bus using the common protocol.

15. The system of claim 10, further comprising a projection distance component configured to determine a projection distance along the future driving path, wherein the drive history path attributes provided by the path projection component correspond to a portion of the future driving extending from the location of vehicle to the projection distance.

16. The system of claim 10, wherein the plurality of controllers comprise one or more of an adaptive cruise control, an energy management controller, a curve warning controller, a headlight controller, a lane departure warning system, a hill power train optimization controller, a driver notification system, an automated driving system, and a driver assistance system.

17. Non-transitory computer readable storage media storing instructions that, when executed by one or more processors, cause the processors to:
   determine a location of a vehicle;
   determine a future driving path for the vehicle;
   determine, based on a drive history, drive history path attributes for the future driving path, the drive history path attributes comprising one or more of road geometry, speed limits, previous actual driving speeds of the vehicle or driver, or previously detected obstacles or hazards along the future driving path; and
   provide the drive history path attributes to a plurality of controllers via a controller bus, wherein the path attributes are provided to the plurality of controllers using a common protocol, wherein two or more of the plurality of controllers receive a specific path attribute via a single message on the controller bus, and wherein the plurality of controllers control operation of the vehicle during driving of the future driving path based on the drive history path attributes.

18. The computer readable media of claim 17, wherein each of the plurality of controllers are configured to receive or process the drive history path attributes in the common format.

19. The computer readable media of claim 17, wherein the controller bus is configured to publish a subset of the drive history path attributes to a specific controller of the plurality of controllers based on subscriptions of the specific controller.

20. The computer readable media of claim 17, wherein the controller bus comprises a controller area network (CAN) bus.

* * * * *